(12) United States Patent
Zimmer et al.

(10) Patent No.: US 7,854,094 B2
(45) Date of Patent: Dec. 21, 2010

(54) INVISIBLE DIVISION BAR MODULAR ASSEMBLY

(75) Inventors: John Zimmer, Canton, MI (US); Karl Deline, Romulus, MI (US); Rod Bara, Rochester Hills, MI (US)

(73) Assignee: Cooper-Standard Automotive Inc., Novi, MI (US)

( * ) Notice: Subject to any disclaimer, the term of this patent is extended or adjusted under 35 U.S.C. 154(b) by 0 days.

(21) Appl. No.: 12/013,948

(22) Filed: Jan. 14, 2008

(65) Prior Publication Data

US 2008/0224501 A1   Sep. 18, 2008

Related U.S. Application Data

(63) Continuation of application No. 10/966,199, filed on Oct. 15, 2004, now abandoned.

(60) Provisional application No. 60/603,977, filed on Aug. 24, 2004.

(51) Int. Cl.
*E06B 7/16* (2006.01)

(52) U.S. Cl. .............................. 49/440; 49/502; 49/374

(58) Field of Classification Search .................. 49/440, 49/428, 414, 441, 502, 374, 490.1; 52/204.1, 52/207; 264/174.11, 137.17; 296/146.9, 296/146.15, 39.1, 1.08
See application file for complete search history.

(56) References Cited

U.S. PATENT DOCUMENTS

| | | | |
|---|---|---|---|
| 4,370,832 A | | 2/1983 | Koike |
| 4,653,230 A | | 3/1987 | Seo et al. |
| 4,874,201 A | | 10/1989 | Scaglietti |
| 4,970,828 A | * | 11/1990 | Mesnel et al. .................. 493/74 |
| 5,027,556 A | | 7/1991 | Ginster |
| 5,040,333 A | * | 8/1991 | Mesnel et al. .................. 49/374 |
| 5,054,242 A | | 10/1991 | Keys et al. |
| 5,199,761 A | | 4/1993 | Dannecker et al. |
| 5,791,716 A | | 8/1998 | Takagi et al. |
| 6,250,017 B1 | | 6/2001 | Tessier |
| 6,309,011 B1 | | 10/2001 | Matsuyama et al. |
| 6,394,529 B2 | * | 5/2002 | Davis et al. ............ 296/146.16 |
| 2004/0194390 A1 | | 10/2004 | Ishikawa et al. |
| 2005/0188622 A1 | | 9/2005 | Nestell |
| 2007/0089371 A1 | | 4/2007 | Krause |

\* cited by examiner

*Primary Examiner*—Gregory J. Strimbu
(74) *Attorney, Agent, or Firm*—Fay Sharpe LLP

(57) ABSTRACT

A surround molding module incorporates an invisible division bar assembly. The invisible division bar assembly includes a support or glass encapsulation that does not extend outwardly beyond the plane of the exterior surface of fixed and movable windows of the vehicle. It provides a butt joint between these window edges. The support also carries a guide member that guides a guide leg extending outwardly from the movable window. An effective window guide tracking system is provided that has reduced wind noise and a flush window appearance with no off-set.

8 Claims, 4 Drawing Sheets

INVISIBLE DIVISION BAR MODULAR ASSEMBLY

BACKGROUND OF THE INVENTION

The present application is a continuation application of U.S. application Ser. No. 10/966,199, filed Oct. 15, 2004 and now abandoned, the disclosure of which is incorporated herein by reference and which claims benefit of U.S. Provisional Application Ser. No. 60/603,977, filed Aug. 24, 2004.

The present invention relates generally to a window support structure for a vehicle, and more particularly to a sealing system and invisible division bar modular assembly that interfaces between a fixed window and a movable window of a vehicle.

It is known to provide a division bar that extends in a generally vertical direction between header and belt line portions of a vehicle window opening. The division bar is typically attached to or molded into a window encapsulation assembly associated with the fixed window. Unfortunately, known arrangements do not adequately address wind noise, aesthetics or appearance, and are not integrally incorporated into a glass guide tracking system for the adjacent movable window. It would therefore be desirable to provide a flush appearance with no glass offset, and particularly one incorporated into a surround module that adequately seals against the movable window. It would also be beneficial if the window provided a flush appearance with the division bar. Aesthetically, it would create a smoother line that provides a generally continuous glass-look finish between the front and movable window and a rear or fixed window. Moreover, known division bar assemblies extend outwardly from an exterior surface or plane of the windows. Aside from the aesthetic appearance issues noted above, the outwardly extending division bar creates an undesired drag and generates wind noise.

Conventional sealing systems often incorporate multiple components for sealing about the periphery of the window to the vehicle. In addition, these assemblies must provide a smooth transition with the vehicle body, i.e., blend in and provide an aesthetically pleasing appearance with the exterior vehicle appearance. Thus, moldings are provided with the glass run channels to improve the exterior appearance of the glass run channel. Likewise, a separate or inner garnish trim is usually provided to add a pleasing appearance about the window opening along the interior of the vehicle. Again, multiple assembly operations are typically required to secure the glass run channel, belt weatherstrip, decorative molding, inner garnish, etc. Each component adds additional cost and assembly. Thus, it has been proposed by the assignee of the present application to provide a surround molding module such as shown and described in U.S. Pat. No. 5,702,148, the details of which are incorporated herein by reference. As described in the '148 patent, a fixed glass assembly typically incorporates a divider bar, one portion of which supports the glass run channel and a second portion formed of an elastomeric material molded about the periphery of the fixed window.

An improvement of the modular molding assembly that adequately seals about the windows of a vehicle, addresses assembly issues, and provides a division bar assembly with a smooth and flush appearance and that improves wind noise is desired.

SUMMARY OF THE INVENTION

An invisible division bar is provided that spans the interface between a movable window and a fixed window, and guides and seals the movable window while providing a flush glass appearance, i.e., without protruding beyond an exterior surface of the windows.

A preferred embodiment of the division bar assembly includes a first portion or support secured to a fixed window and a second portion or guide fixed to the movable window. The guide is received in a guide member cavity of the support which includes a low-friction material.

At least one seal lip extends from the support for engaging an inner surface of the movable window.

An inner garnish assembly is provided in a preferred arrangement to provide an aesthetic cover along the interior surface of the vehicle.

The support preferably includes a cavity that receives a glass run channel. The glass run channel in a preferred arrangement includes the low friction material.

The division bar assembly does not have any portion extending onto the external surfaces of the windows.

A primary benefit of the invention is the improved aesthetics associated with the arrangement.

Another benefit offered by the invention is the low profile and reduced wind noise associated therewith.

Still another benefit is the ease of incorporation of the assembly into a surround molding module that facilitates assembly.

Still other features and benefits of the invention will become apparent to those skilled in the art upon reading and understanding the following detailed description.

DETAILED DESCRIPTION OF THE INVENTION

Figure 1:
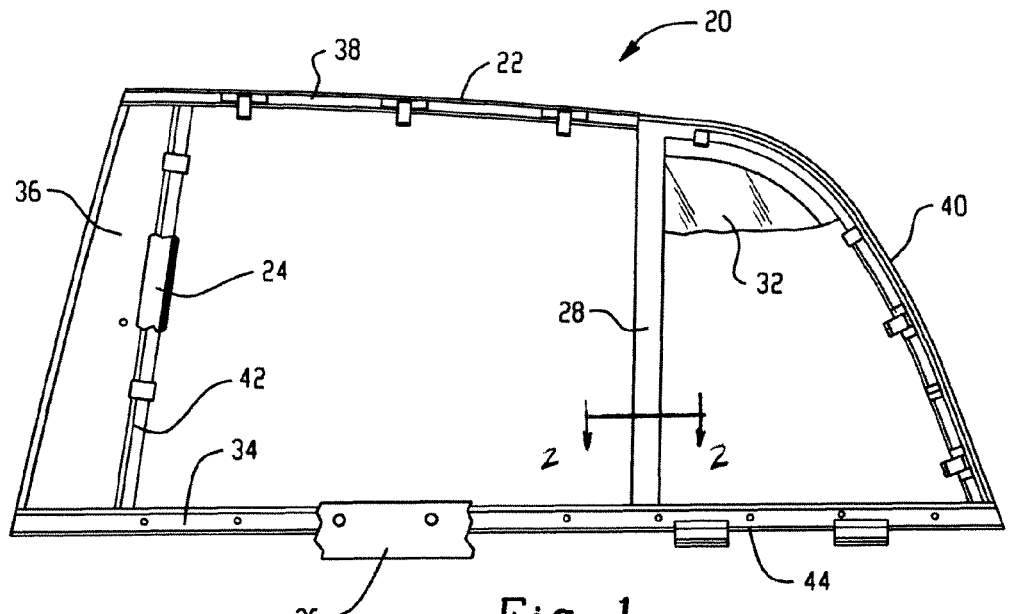
FIG. 1 is an elevational view of a prior art molding module used in association with a movable window and a fixed window.
Figure 2:
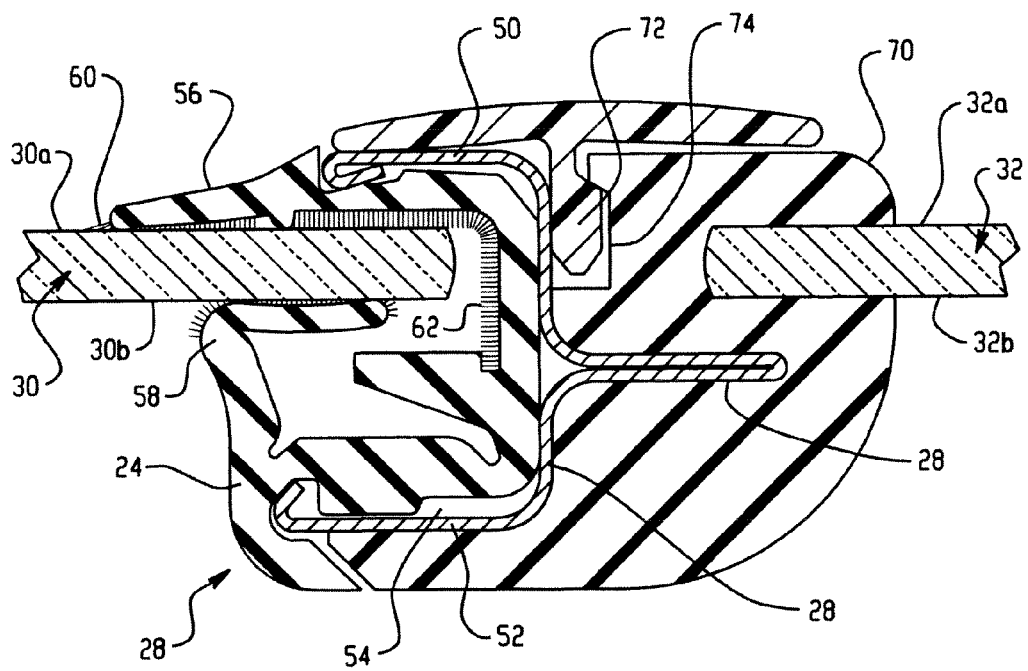
FIG. 2 is a sectional view taken along the line 2-2 in FIG. 1.

Turning briefly to FIGS. 1 and 2, a prior art arrangement disclosed in U.S. Pat. No. 5,702,148 commonly owned by the assignee of the present application, is shown. More particularly, the prior art arrangement shows a molding module 20 that comprises a one-piece surround molding 22, a glass run channel 24, a belt line outer seal 26, and a divider or division bar 28. The division bar is interposed between a movable window 30 and a fixed window 32 (FIG. 2). With reference again to FIG. 1, the one-piece surround molding includes a belt line portion 34, a B-pillar 36, top or header portion 38, and a sloping rear portion 40. Attachment flange portions and a series of attachment clips 42 provide for support and retention of the module or surround molding to the vehicle.

As perhaps best illustrated in FIG. 2, the prior art division bar assembly 28 includes first and second legs 50, 52 that are in generally parallel relation and form a cavity 54 that receives the glass run channel 24. The glass run channel includes a pair of legs having seal lips 56, 58 that engage a first or outer surface 30*a* and a second or inner surface 30*b*, respectively, of the movable window 30. As will be appreciated, the glass run channel 24 typically incorporates a low-friction material such as flock 60 along the seal lips and in a base 62 of the glass run channel to provide a sliding, low friction engagement with the movable window.

The conventional division bar assembly 28 further includes a molded elastomeric material 70 that encapsulates a perimeter edge of the fixed window 32. More particularly, the elastomeric window encapsulation 70 engages opposite first or exterior surface 32*a* and a second or interior surface 32*b* of the fixed window 32. For example, the window encapsulation is preferably formed in an insert molding process where the elastomeric material is bonded to the first and second legs 50, 52 and forms a seal against the outside elements. Moreover, a leg 72 of the surround molding 22 is received in a recess 74 between the division bar and the elastomer material to provide an aesthetic cover in the division bar region of the vehicle.

Although this surround molding module has met with commercial success, the division bar unfortunately provides a raised surface at the interface between the movable and fixed windows, i.e., a raised division bar that is unsightly, and also contributes to wind noise because of the extent by which the division bar protrudes from the external surface of the windows.

Figure 3:
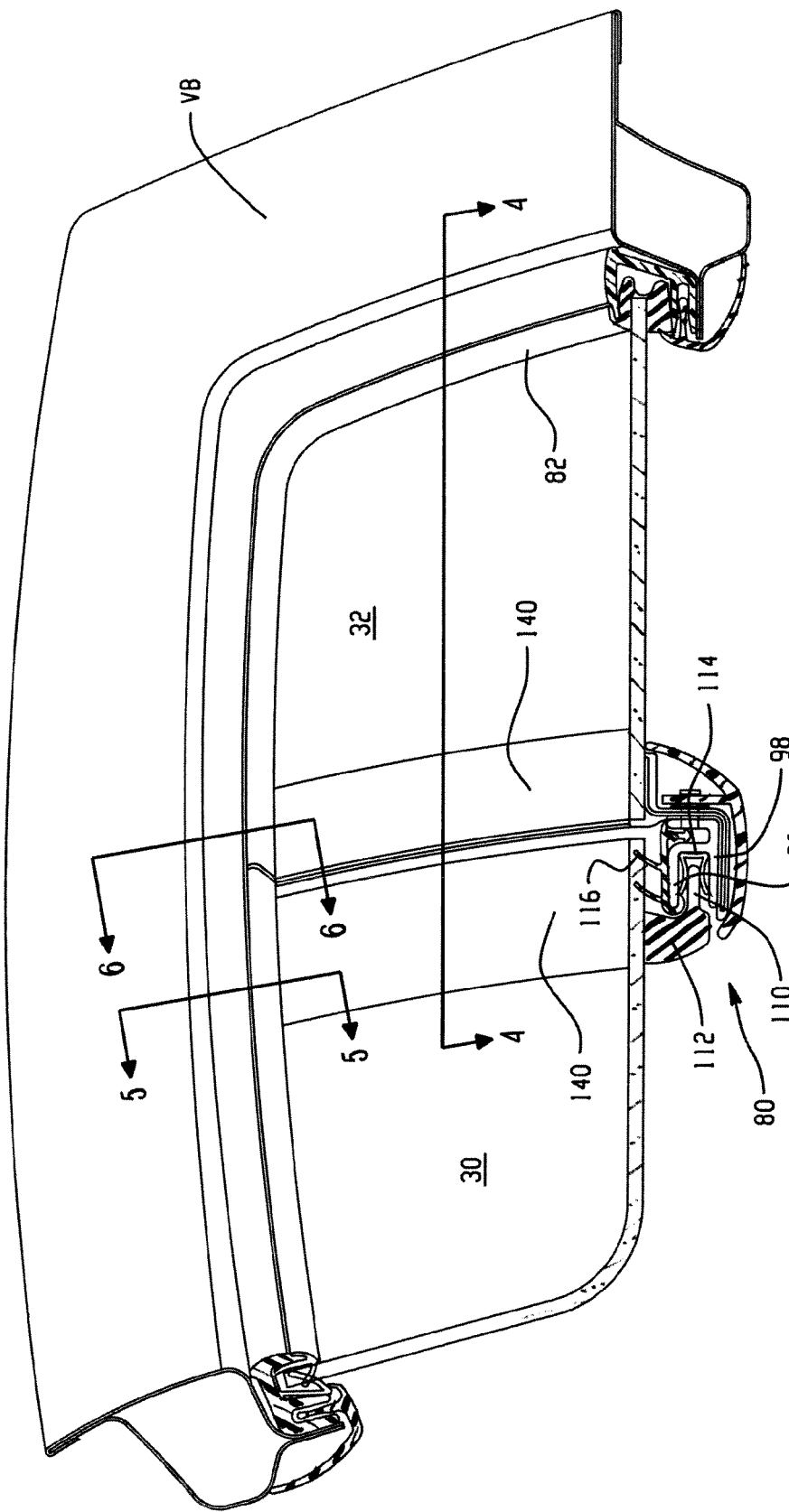
FIG. 3 is a representation, partly in section, of a preferred embodiment of the present invention.
Figure 4:
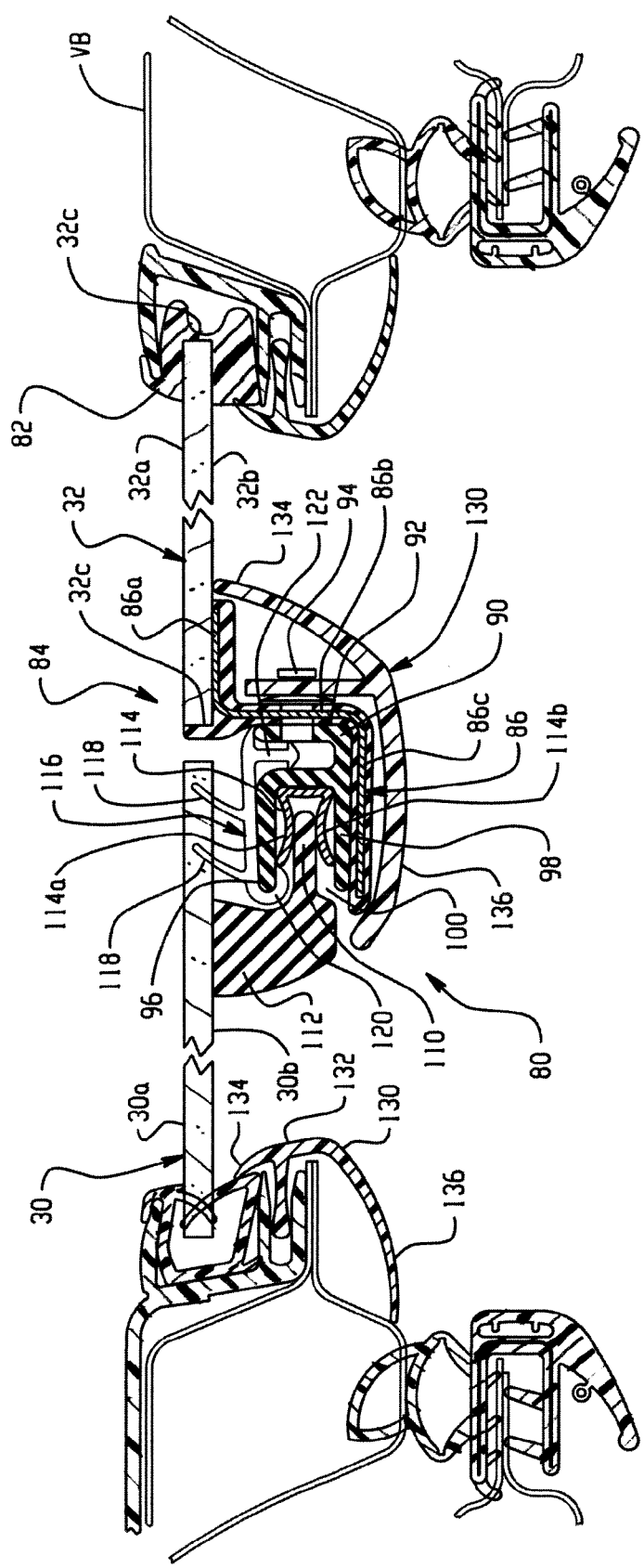
FIG. 4 is a cross-sectional view taken generally along the lines 4-4 of FIG. 3.

FIGS. 3 and 4 more particularly illustrate the subject invention which relates to what is termed herein as an invisible division bar assembly 80. The invisible division bar spans the interface between the movable window 30 and fixed window 32. The window encapsulation 82, preferably an elastomeric material molded to the fixed window, extends about the entire perimeter of the fixed window. Along the three edges of the fixed window that abut or are contiguous with the vehicle body VB, the elastomeric encapsulation 82 engages not only the interior surface 32*b* of the fixed window and the outer edge 32*c*, but also extends over an outer extent of the exterior surface 32*a* of the fixed window. Along the edge that adjoins with the invisible division bar assembly, however, the window encapsulation only engages the inner surface 32*b* and outer edge 32*c* of the fixed window. For ease of reference, this portion of the elastomeric encapsulation at the invisible division bar region is also referred to as a support 84. The support spans generally vertically between the header and belt line and in a preferred arrangement includes a rigid support member 86, such as a metal or plastic support member, substantially encapsulated in the elastomeric material. In the preferred arrangement, the support member 86 includes a first leg 86*a* that extends generally parallel to the interior surface of the fixed window (and which may include one face that is not encapsulated in the elastomeric material), a second leg 86*b* extending generally perpendicularly toward the interior of the vehicle, and a third leg 86*c* that extends forwardly from the second leg and in generally parallel, spaced relation from the interior surface of the movable window (FIG. 4). The elastomeric material of the support 84 may be formed from a wide range of suitable materials such as molded rubber, TPV (thermoplastic vulcanizate), PVC (polyvinyl chloride), or thermoplastic, that is adhesively secured, molded, or rubber bonded to the interior surface 32*b* and outer edge 32*c* of the fixed window. In other words, this portion of the window encapsulation or support provides a butt joint between the movable and fixed windows and does not extend outwardly beyond the plane defined by the exterior surface of the movable and fixed windows. No portion of the support is received over the exterior surface 32*a* of the fixed window nor extends beyond the plane of the exterior surface of the window. This flush arrangement enhances the aesthetics of the division bar assembly and reduces issues with respect to wind noise.

Secured to the support 84 is a portion of the surround molding, identified here by reference numeral 90. The surround molding portion includes a first portion or leg 92 secured to the support, shown here as extending parallel to and preferably secured by fasteners 94, to the second leg 86*b* of the support. It will be appreciated, however, that other securing arrangements may be used without departing from the scope and intent of the present invention. Second and third portions 96, 98 of the surround molding are disposed in spaced, generally parallel relation and define a recess or cavity 100, shown here as a pair of spaced legs extending generally parallel to the interior surface of the movable window. The second and third legs 96, 98 defining the recess 100 form a guide member adapted to receive a leg 110 of guide or window encapsulation 112 that is secured to the interior surface of the movable window adjacent the vertical rear edge thereof. The window encapsulant of the movable window can be any suitable material such as a molded rubber, EPDM, TPV, PVC, etc., that is secured to the interior surface of the movable window, for example, adhesively secured thereto. The window encapsulation 112 can also be molded or rubber bonded to the movable window. The leg 110 is dimensioned for receipt in the cavity 100 and serves the function of guiding or tracking the rear vertical edge of the movable window. To facilitate this movement, a low friction material, is provided in the cavity shown here as a generally U-shaped insert 114 interposed between the legs 96, 98 and the guide leg 110. Generally parallel legs 114*a*, 114*b* of the low friction material insert may be slightly bowed or curved into engagement with the guide leg 110. This arrangement provides a desired low-friction, sliding engagement for the tracking of the rear vertical edge of the movable window.

Also secured to the molding is a glass run channel 116 that includes at least one and preferably a pair of sealing guide lips 118. The sealing guide lips are either formed of a low-friction material, or include a low-friction material along selected portions thereof to provide the desired low-friction, sliding sealing engagement with the interior surface of the movable window. As shown in FIGS. 3 and 4, the glass run channel is formed so that a first edge 120 defines a hook-shape or channel received over the leg 96 of the molding. A leg 122 is received in a recess formed between the first leg and the remainder of the surround molding body 90 and is contoured to provide a snap-fit connection with the molding body. This effectively secures the glass run channel 116 to the support which is, in turn, secured to the fixed window. By virtue of the guide leg 110 received in the recess 100, an effective window seal and support is provided along the rear, vertical edge of the movable window.

For aesthetic purposes, an inner garnish 130 is provided as a part of the invisible division bar assembly 80. The garnish 130 is a fully molded surround component that is mechanically secured to the invisible division bar assembly, as well as to the remainder of the surround molding. For example, one preferred material is a plastic such as a polypropylene, although the invention should not be limited to this particular type of material. The inner garnish is also shown as being mechanically fastened to the support along the invisible division bar assembly, while along other regions of the surround molding module, the inner garnish may include a leg secured by clips (see left- and right-hand cross sections along the invisible division bar assembly). The inner garnish has overlay or cover portions 134, 136 that provide an aesthetic finish to the assembly so that the individual components of the division bar assembly are visible from the interior of the vehicle.

It will be appreciated that the surround molding 90 is preferably either molded, extruded, or formed separately from the other components, while the glass run channel 116 in the preferred arrangement is molded at the upper B-pillar and molded in the division bar to the header. Preferred materials are EPDM or plastic, although plastic has the additional advantage of reduced cost.

Preferably, the front vertical edge of the fixed window 32 and the rear vertical edge of the movable window 30 are darkened, for example with a black-out frit 140. The frit is provided for aesthetic reasons of masking or hiding the remaining components of the invisible division bar assembly.

Figure 5:
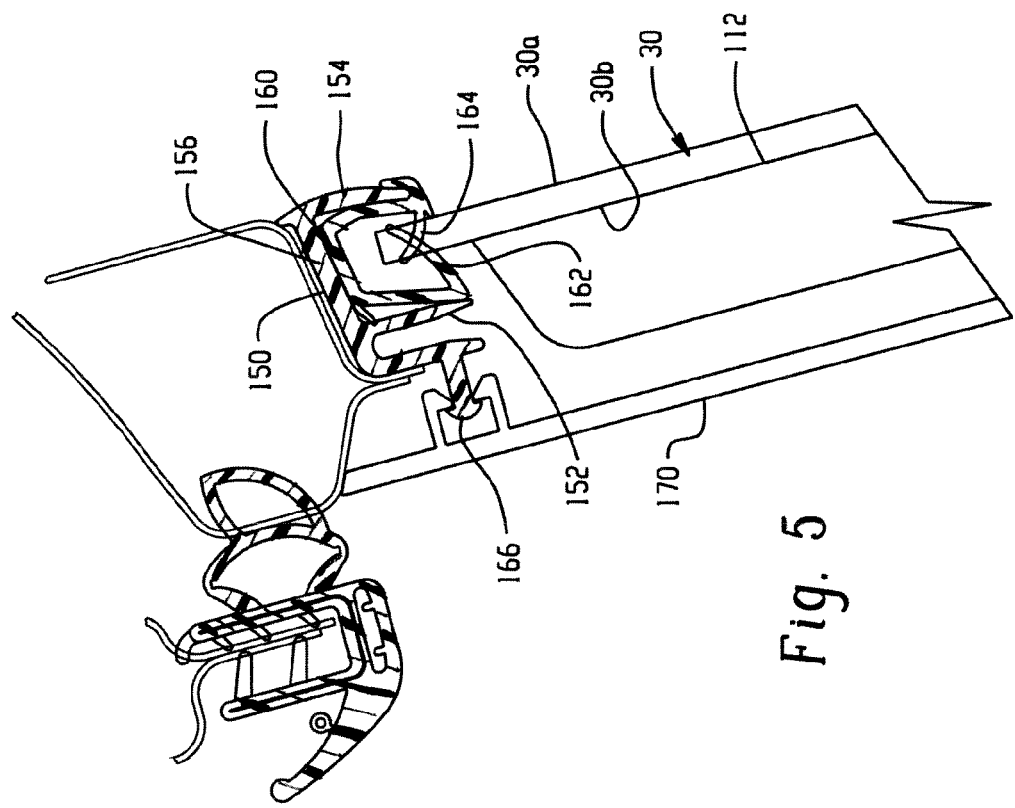
FIG. 5 is a sectional view taken generally along the lines 5-5 though the movable window portion of FIG. 3.

FIG. 5 illustrates a cross-section through the header portion adjacent the movable window. The surround molding 150 in this region includes a pair of spaced legs 152, 154 forming a channel 156 that receives a generally conventional glass run channel 160. The glass run channel legs include seal lips 162, 164 which engage the inner and outer surfaces of the movable window. The surround molding module further includes leg 166 that secures the inner trim 170. It is also apparent from FIG. 5 that the guide or window encapsulation 112 secured to the interior surface 30b of the movable window also terminates before reaching the upper edge of the movable window. This allows that portion of the movable window to be effectively received in the glass run channel along the header.

Figure 6:
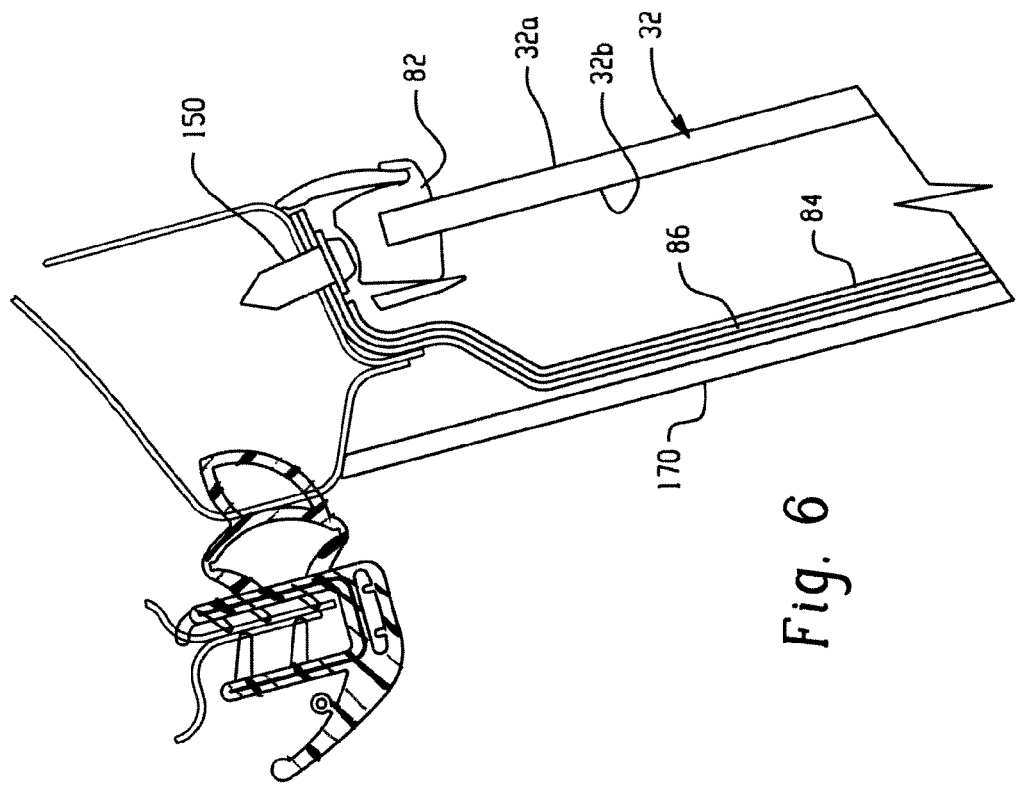
FIG. 6 is a sectional view taken generally along the lines 6-6 through the fixed window portion of FIG. 3.

FIG. 6 illustrates a cross-sectional view along the header portion, but through the fixed window region. This view further illustrates how the support assembly 84 of the invisible division bar assembly is secured to the vehicle body, for example via fasteners 150, and moreover how the inner trim 170 effectively covers the invisible division bar assembly in this region, as well as covering the interfit between the surround molding and the window encapsulation of the fixed window.

Although illustrated in FIGS. 4-6, the door seal assembly is secured to flanges of the vehicle body and has hollow bulb portions that extend into sealing engagement with portions of the door. These components are illustrated but form no part of the present invention, so that further discussion herein is deemed unnecessary.

The invention has been described with reference to the preferred embodiments. Of course, modifications and alterations will become apparent to those of ordinary skill in the art, and the invention should not be limited to the described embodiments.

Having thus described the invention, it is now claimed:

1. A division bar assembly disposed in a vehicle between an associated fixed window and an associated movable window, wherein the fixed and movable windows are generally located in a single plane, the division bar assembly comprising:
   a support including an elastomeric material having a rigid metal support member being generally Z-shaped in cross section generally encapsulated therein, the support member including a first support leg that extends generally parallel to an interior surface of the associated fixed window, a second support leg extending generally perpendicular to the first support leg, and a third support leg extending generally parallel to, and in spaced relation from an interior surface of the associated movable window, the support mounted to the associated fixed window;
   a guide situated adjacent to a rear edge of the associated moveable window, the guide affixed to and extending from only the interior surface of the associated moveable window;
   a guide member extending from the support and including a generally U-shaped cavity that opens in a direction that is parallel to the interior surface of the associated moveable window, wherein the guide is fixedly secured to the interior surface of the associated movable window and includes a first guide leg spaced from the interior surface of the associated movable window;
   a low friction material over at least a portion of the cavity; and
   at least one seal lip extending outwardly from the guide member and engaging with the interior surface of the associated moveable window.

2. The division bar assembly of claim 1 further comprising an inner garnish operatively secured to the guide member and disposed in covering relation thereto.

3. The division bar assembly of claim 1 wherein the cavity is dimensioned to receive the first guide leg of the guide therein.

4. The division bar assembly of claim 3 wherein the first support leg is fixedly secured to the interior surface of the associated fixed window.

5. The division bar assembly of claim 4 wherein the second support leg perpendicularly extends from the interior surface of the associated fixed window to an interior of the vehicle.

6. The division bar assembly of claim 1 wherein the low friction material includes flock.

7. A division bar assembly disposed in a vehicle between an associated fixed window and an associated movable window, wherein the fixed and movable windows are generally located in a single plane, the division bar assembly comprising:
   a support including an elastomeric material having a rigid metal support member being generally Z-shaped in cross section generally encapsulated therein, the support member including a first support leg that extends generally parallel to an interior surface of the associated fixed window, a second support leg extending generally perpendicular to the first support leg from the interior surface of the associated fixed window to an interior of the vehicle, and a third support leg extending generally parallel to, and in spaced relation from an interior surface of the associated movable window, the support mounted to the associated fixed window;
   a guide situated adjacent to a rear edge of the associated moveable window, the guide affixed to and extending from only the interior surface of the associated moveable window;
   a guide member extending from the support and including a generally U-shaped cavity that opens in a direction that is parallel to the interior surface of the associated moveable window, wherein the guide is fixedly secured to the interior surface of the associated movable window and includes a first guide leg spaced from the interior surface of the associated movable window;
   a low friction material over at least a portion of the cavity;
   at least one seal lip extending outwardly from the guide member and engaging with the interior surface of the associated moveable window; and
   an inner garnish operatively secured to the guide member and disposed in covering relation thereto.

8. The division bar assembly of claim 7 wherein the inner garnish has a first garnish leg that overlies the first support leg of the support member and a second garnish leg that overlies the cavity.

\* \* \* \* \*